United States Patent
Minowa et al.

[11] Patent Number: 6,032,646
[45] Date of Patent: Mar. 7, 2000

[54] CONTROL APPARATUS AND A CONTROL METHOD FOR A VEHICLE

[75] Inventors: Toshimichi Minowa, Tokai-mura; Satoshi Kuragaki, Hitachinaka, both of Japan; Junichi Ishii, Novi, Mich.

[73] Assignee: Hitachi, Ltd., Tokyo, Japan

[21] Appl. No.: 09/346,579

[22] Filed: Jul. 2, 1999

Related U.S. Application Data

[63] Continuation of application No. 08/989,024, Dec. 11, 1997, Pat. No. 5,947,087, which is a continuation of application No. 08/816,703, Mar. 13, 1997, Pat. No. 5,724,944, which is a continuation of application No. 08/695,345, Aug. 9, 1996, Pat. No. 5,638,790, which is a continuation of application No. 08/365,444, Dec. 28, 1994, abandoned.

[30] Foreign Application Priority Data

Dec. 28, 1993 [JP] Japan ..................................... 5-334926

[51] Int. Cl.⁷ ............................. F02D 11/10; B60K 28/16
[52] U.S. Cl. .......................... 123/396; 123/399; 180/167; 701/115; 701/117
[58] Field of Search .................................... 123/335, 361, 123/396, 399, 436, 478, 480, 486; 477/107, 110, 111; 180/167, 168, 169, 170, 178, 179, 69.4; 340/901, 903, 905, 435; 701/103, 104, 105, 110, 115, 117, 118, 119

[56] References Cited

U.S. PATENT DOCUMENTS

| | | | |
|---|---|---|---|
| 4,678,056 | 7/1987 | Kobari et al. | 180/167 |
| 4,748,957 | 6/1988 | Menard et al. | 123/478 |
| 4,976,239 | 12/1990 | Hosaka | 123/399 |
| 5,026,153 | 6/1991 | Suzuki et al. | 180/167 |
| 5,137,000 | 8/1992 | Stepper et al. | 123/478 |
| 5,190,020 | 3/1993 | Cho | 123/684 |
| 5,200,900 | 4/1993 | Adrain et al. | 123/486 |
| 5,257,193 | 10/1993 | Kusaka et al. | 123/478 |
| 5,293,317 | 3/1994 | Adrain et al. | 123/486 |
| 5,299,130 | 3/1994 | Ono | 180/167 |
| 5,307,136 | 4/1994 | Saneyoshi | 180/167 |
| 5,315,295 | 5/1994 | Fujii | 180/167 |
| 5,339,241 | 8/1994 | Fujimori et al. | 180/167 |
| 5,445,128 | 8/1995 | Letang et al. | 123/436 |
| 5,485,892 | 1/1996 | Fujita | 180/167 |
| 5,530,420 | 6/1996 | Tsuchiya et al. | 180/167 |
| 5,532,929 | 7/1996 | Hattori et al. | 123/361 |
| 5,566,072 | 10/1996 | Momose et al. | 710/117 |
| 5,617,085 | 4/1997 | Tsutsumi et al. | 180/167 |
| 5,625,558 | 4/1997 | Togai et al. | 123/399 |
| 5,638,272 | 6/1997 | Minowa et al. | 123/396 |
| 5,638,790 | 6/1997 | Minowa et al. | 123/436 |
| 5,642,712 | 7/1997 | Biondo | 123/396 |
| 5,724,944 | 3/1998 | Minowa et al. | 123/436 |
| 5,769,051 | 6/1998 | Bayron et al. | 123/335 |
| 5,775,293 | 7/1998 | Kresse | 123/396 |
| 5,850,254 | 12/1998 | Takano et al. | 180/167 |
| 5,852,996 | 12/1998 | Nakamura et al. | 123/399 |
| 5,947,087 | 9/1999 | Minowa et al. | 123/399 |

FOREIGN PATENT DOCUMENTS

| | | |
|---|---|---|
| 62-126235 | 6/1987 | Japan . |
| 7-047862 | 2/1995 | Japan . |

*Primary Examiner*—Willis R. Wolfe
*Attorney, Agent, or Firm*—Evenson, McKeown, Edwards & Lenahan, PLLC

[57] ABSTRACT

A control device and a control method capable of eliminating a torque variation in changing an air/fuel ratio and establishing a compatibility of promotion in fuel economy with promotion in drivability is provided. The device includes an outer environment detector for detecting an outer environment in running a vehicle, a running environment determining device for predicting a current running environment in accordance with the outer environment, a data storage device for storing data for changing a driving characteristic, a selecting device for selecting the data, a control quantity calculator for calculating a control quantity based on the data, and a control actuator for controlling a control object. The engine output is efficiently utilized since the air/fuel ratio is changed in accordance with the change in the running environment, and the fuel cost reduction and the promotion of the drivability can be achieved since the selecting of the air/fuel ratio is performed in accordance with the running environment.

3 Claims, 11 Drawing Sheets

CONTROL APPARATUS AND A CONTROL METHOD FOR A VEHICLE

This application is a continuation of application Ser. No. 08/989,024, filed Dec. 11, 1997, now U.S. Pat. No. 5,947,087, which is a continuation of application Ser. No. 08/816,703, filed Mar. 13, 1997, now U.S. Pat. No. 5,724,944, which is a continuation of application Ser. No. 08/695,345, filed Aug. 9, 1996, now U.S. Pat. No. 5,638,790, which is a continuation of application Ser. No. 08/365,444, filed Dec. 28, 1994, which is now abandoned.

FIELD OF THE INVENTION

This invention relates to a control apparatus and a control method for a motor vehicle, and, in particular, to a control apparatus and a control method for a motor vehicle for efficiently controlling an engine power train in accordance with various information such as a running environment of the motor vehicle and the like.

BACKGROUND OF THE INVENTION

A known conventional control system, for instance, as disclosed in Japanese Patent Laid Open No. Sho 62-126235, determines an operating region in accordance with a change in an operating state, that is, a change in an engine load (pressure in the intake pipe, air/fuel ratio sensor signal or the like) and a change in an engine rotational speed, for establishing compatibility between fuel economy and drivability, and reads a target air/fuel ratio value which has been set for every operating region, thereby changing the air/fuel ratio of an engine.

When the target air/fuel ratio is changed with the engine load and the engine rotational speed as parameters as in the conventional technology, a steady state condition is changed to another steady state condition. The fuel quantity is then changed during acceleration of the vehicle by which a torque variation is generated. This produces a strange feeling for the vehicle operator since the fuel quantity is changed during the acceleration. Further, when a NOx reduction catalyst is not employed, the air/fuel ratio considerably changes from an air/fuel ratio of 14.7, which is the theoretical mixture ratio, to around an air/fuel ratio of 24 for reducing a discharge quantity of NOx, by which the torque variation is further increased.

SUMMARY OF THE INVENTION

There is therefore needed a control apparatus and a control method capable of achieving compatibility between promoting the fuel economy and the drivability by eliminating torque variations which occur in changing the air/fuel ratio during a running operation of a motor vehicle.

These needs are met according to the present invention which provides a control apparatus and method including an outer environment detector for detecting the outer environment during the running of the motor vehicle, a running environment determining system for predicting a current running environment, for instance, a road incline, a road with a traffic jam, and the like, in accordance with the outer environment, a data storing device for storing data used to change an operating characteristic in accordance with the running environment, a switching system for switching the data in accordance with the running environment, a control quantity calculator for calculating a control quantity based on the data selected from the data storing device and a control actuator for controlling a control object. These systems can be implemented in either a hardware circuit, or as software applications operating on a microprocessor or the like.

It is an advantage of the present invention, constructed as described above, that the data, such as the air/fuel ratio or the like, is always switched taking into consideration the running environment in a non-steady state condition, a speed changing condition, a stopping condition, an idling condition, a operation of a shift lever, and the like. Therefore, any unpleasant feeling for the driver due to the torque variation accompanied by the change in the air/fuel ratio is eliminated. Accordingly, a reduction in the actual fuel cost and a promotion of the drivability can both be achieved.

A detailed explanation will be given to embodiments of the present invention based on the drawings as follows.

DETAILED DESCRIPTION OF THE DRAWINGS

Figure 1:
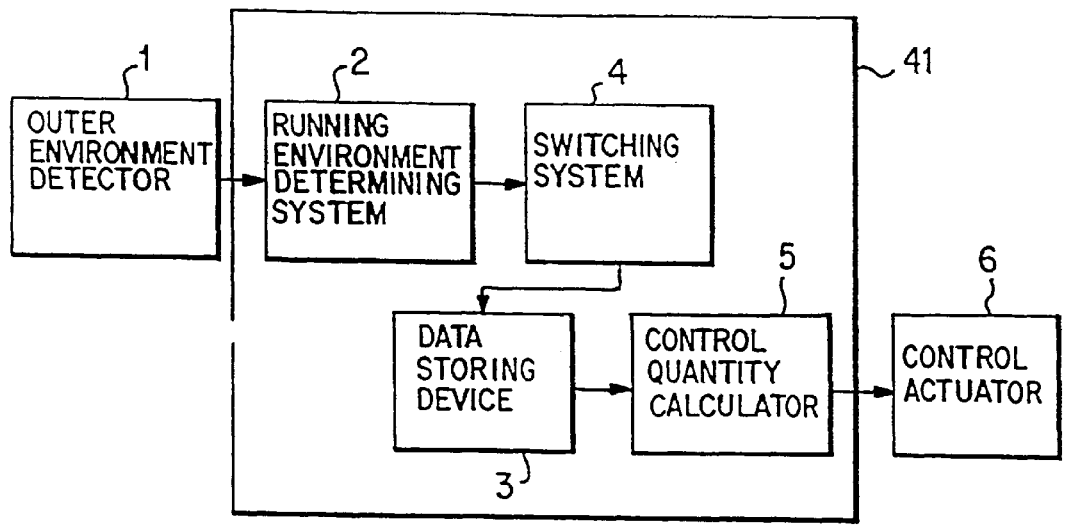
FIG. 1 is a block diagram of an embodiment of the control system of the present invention.

FIG. 1 is a block diagram of an embodiment of the control system of the present invention. First, signals or images from an outer environment detector 1 for detecting conditions of an outer environment during the running of a motor vehicle, are input to a running environment determining system 2 in a controller 41. The running environment determining system 2 predicts the current running environment for the motor vehicle, for instance, a road incline, a traffic jam on a road, and the like, in accordance with the signals detected by the outer environment detector 1. Next, a data storing device 3 stores data used to change an operating characteristic in accordance with the running environment. A switching system 4 selects the data in the data storing device 3 based on the environment which has been determined by the running environment determining system 2. A control quantity calculator 5 calculates a control quantity based on the selected data, and outputs the control quantity to a control actuator 6, thereby controlling a control object, such as the engine, transmission, or the like.

Figure 2:
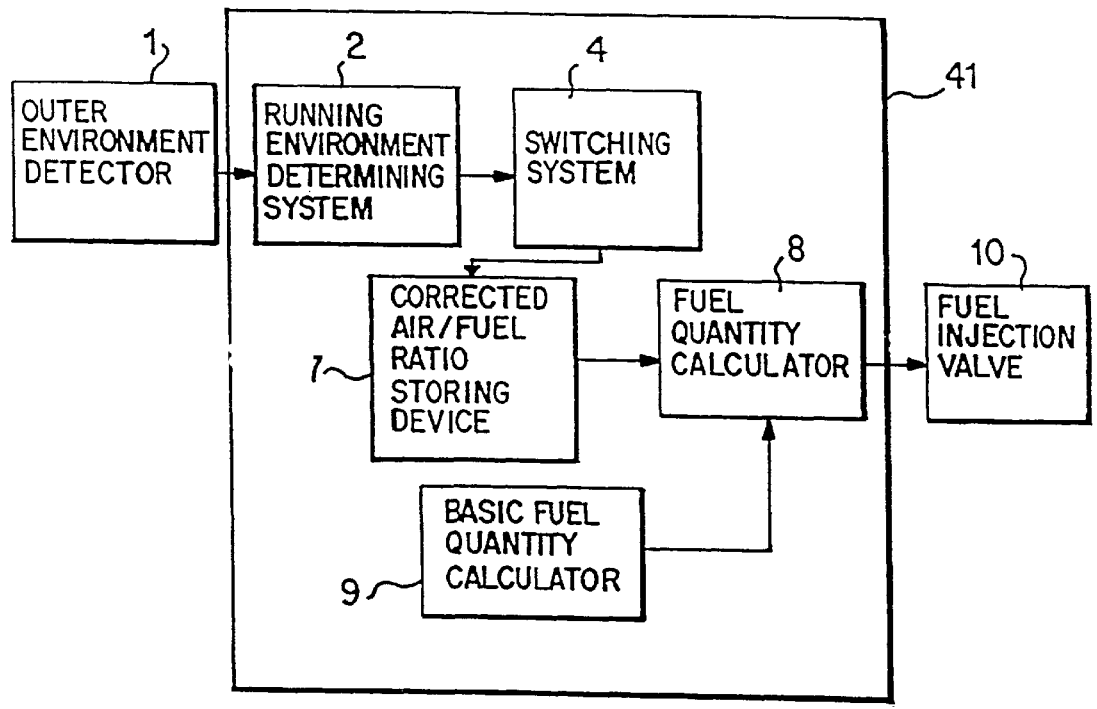
FIG. 2 is a block diagram illustrating an example of the construction of a specific control system according to the embodiment in FIG. 1.

FIG. 2 is a specific example of the embodiment illustrated in FIG. 1. As in FIG. 1, signals or images from the outer environment detector 1 for detecting the outer environment in the running of a motor vehicle are input to the running environment determining system 2, and the current running environments, for instance, a road incline, a traffic jam on a road, or the like, are predicted in accordance with the outer environment. Next, a corrected air/fuel ratio storing device 7 stores corrected air/fuel ratios in accordance with a plurality of running environment conditions. These corrected air/fuel ratios are switched by the switching system 4, and a desired air/fuel ratio of an engine is achieved in accordance with the current running environment. Further, a fuel quantity calculator 8 receives values which have been calculated by the corrected air/fuel ratio storing device 7 and a basic fuel quantity calculator 9. The basic fuel quantity is normally calculated by an air flow quantity and the engine rotational speed. The final calculation of fuel quantity is performed by calculating a correction coefficient based on the data of the corrected air/fuel ratio storing device 7 and multiplying or adding the coefficient to the basic fuel quantity. Further, the calculated value is output to the fuel injection valve 13 based on a reference signal of engine rotational speed.

Figure 3:
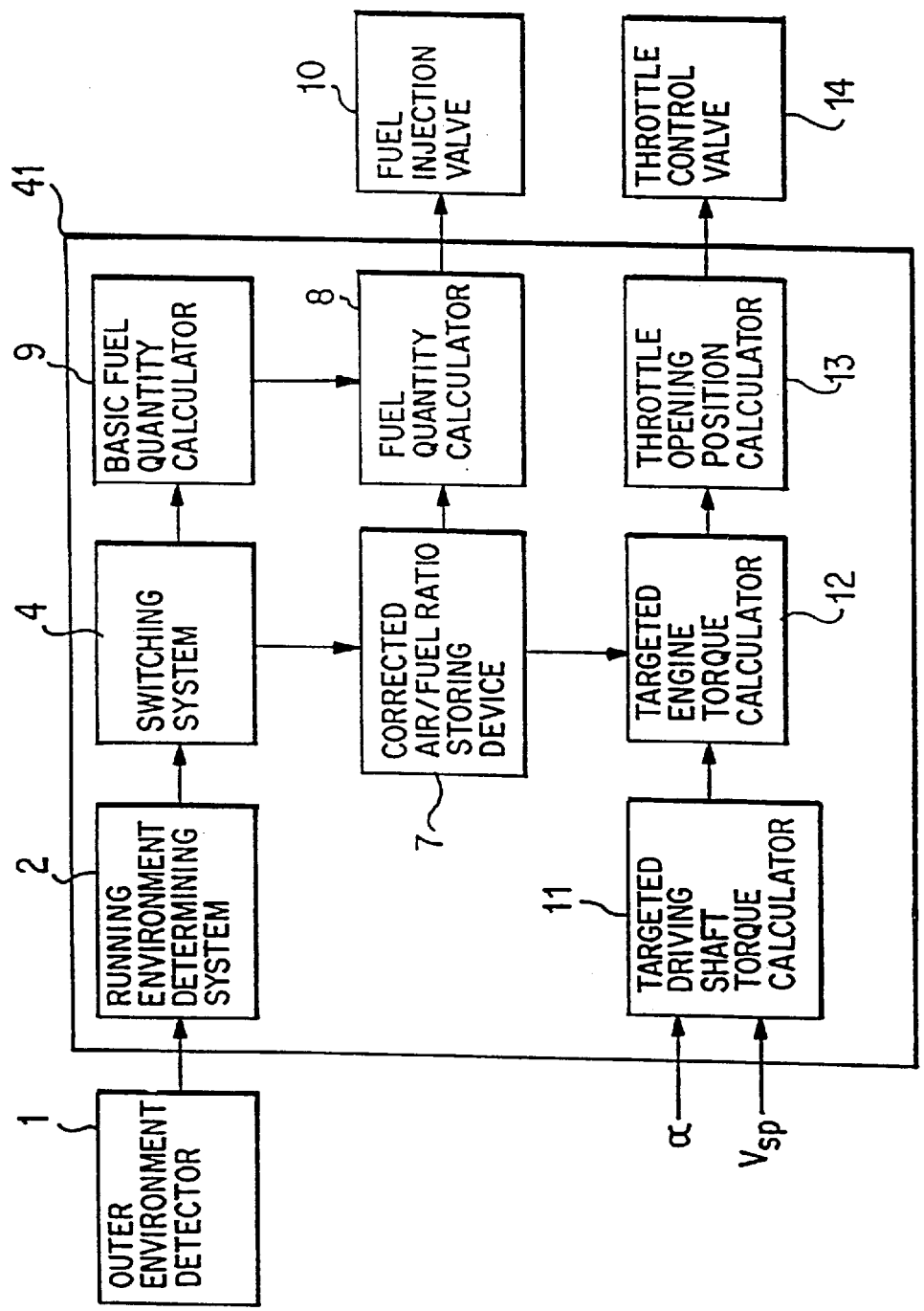
FIG. 3 is a block diagram wherein control of an air flow quantity is added to the fuel control system illustrated in FIG. 2.

FIG. 3 is a control block diagram in which the fuel control illustrated by FIG. 2 further includes an air flow quantity control. The fuel injection valve control is the same as in FIG. 2. Further, a targeted driving shaft torque calculator 11 detects input signals and calculates a targeted driving shaft torque which is required by a driver using signals of the accelerator opening position α, a vehicle speed Vsp, and the like. The targeted engine torque calculator 12 calculates a targeted engine torque using the targeted driving shaft torque, a torque converter characteristic of the transmission, an engine characteristic, and the like, and further based on the data from the corrected air/fuel ratio storing device 7. Next, a throttle opening position calculator 13 calculates a targeted opening position for the throttle based on the targeted engine torque, the engine rotational speed, and the like. The targeted opening position is output to a throttle control valve 14, which is electronically controlled by a motor or the like. Accordingly, the addition of this air flow quantity control can correct the engine torque which changes by a change in the air/fuel ratio, by the air flow quantity, thereby promoting the drivability of the motor vehicle.

Figure 4:
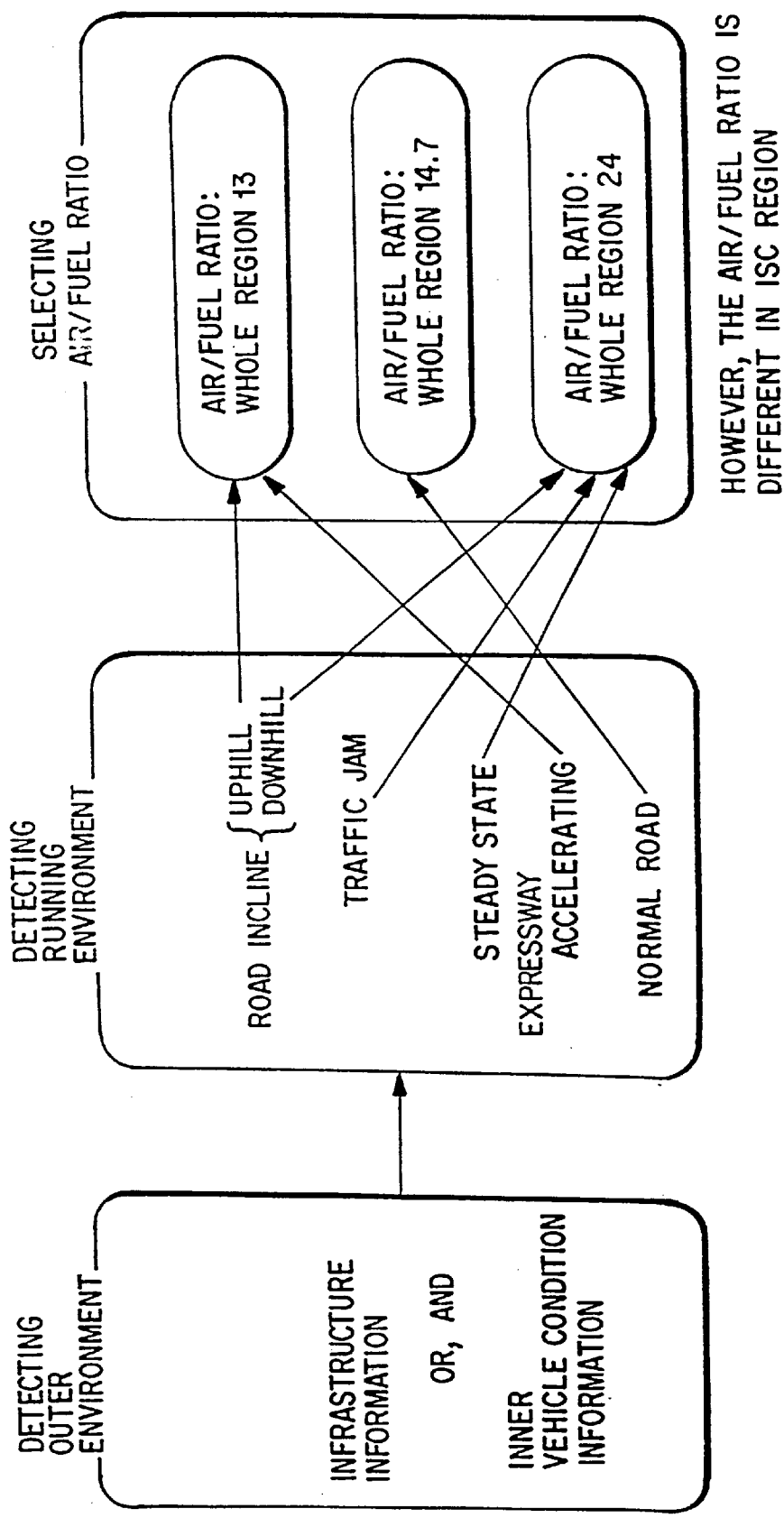
FIG. 4 is a conceptual diagram illustrating a specific example of the switching of an air/fuel ratio.

FIG. 4 illustrates a specific example of the switching of the air/fuel ratio. In detecting the outer environment, first, one method makes use of outer infrastructure information such as information gathered from display boards installed on the roads or road information gathered by an FM multiplex transmitter. Second, another method detects outer environment information using an outer vehicle environment recognizing sensor, such as a TV or video camera, provided inside the vehicle. A third method makes use of the processed data and operating signals of a vehicle (for instance, vehicle speed, output shaft torque etc.). For detecting the outer environment, a combination of the methods described above, or an individual method, may be used. The method to be used can be determined in accordance with the detection accuracy and the circumstances of the application. Next, the running environment is determined.

This includes information on the road incline, such as an uphill or downhill, if a traffic jam is present, the steady state or the acceleration state of an expressway, a city traffic driving situation, and the like. These outer running environment conditions are provided by the outer environment detector. Further, an air/fuel ratio is selected in switching the air/fuel ratio. The selected air/fuel ratio achieves compatibility between the drivability and the fuel economy according to the running environment. For instance, in case of an uphill road incline and an expressway acceleration, the air/fuel ratio needs a rich mixture ratio of about 13. This is because there is a high probability that maximum engine output is required. Further, in the case of a downhill road incline, a traffic jam, or steady state condition on an expressway, the air/fuel ratio is determined to be a lean mixture ratio of approximately 24. This is because a high engine output is not necessary, thereby achieving a considerable reduction in the fuel cost. Further, for the case of normal running in a city area or the like, the air/fuel ratio is determined to be at the theoretical mixture ratio of 14.7.

Figure 5:
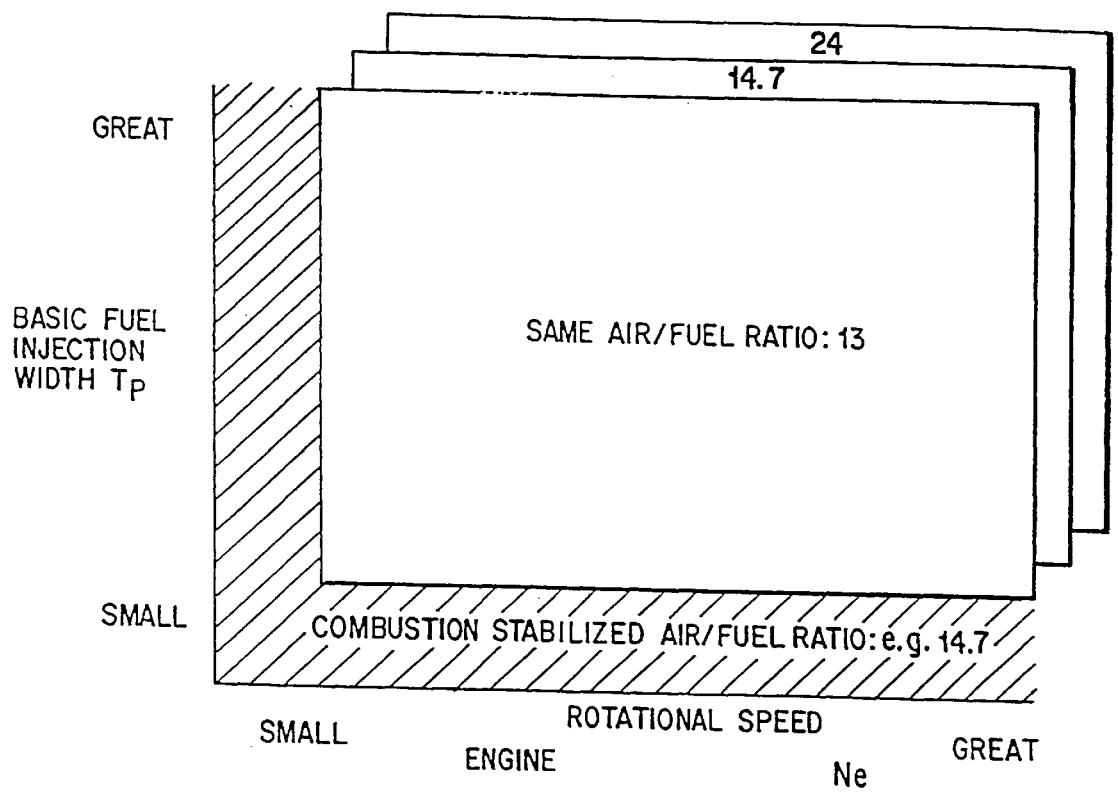
FIG. 5 illustrates an example of a correction table diagram of a target air/fuel ratio.

As shown in FIG. 5, a correction table for the air/fuel ratio is shown with the engine rotational speed Ne as the abscissa and the basic fuel injection width Tp as the ordinate. In the region of a low engine rotational speed including the idling state, and a low basic fuel injection width, the air/fuel ratio is determined such that the combustion is stabilized. For example, when better engines are developed, the engines can be driven by a leaner mixture.

Figure 6:
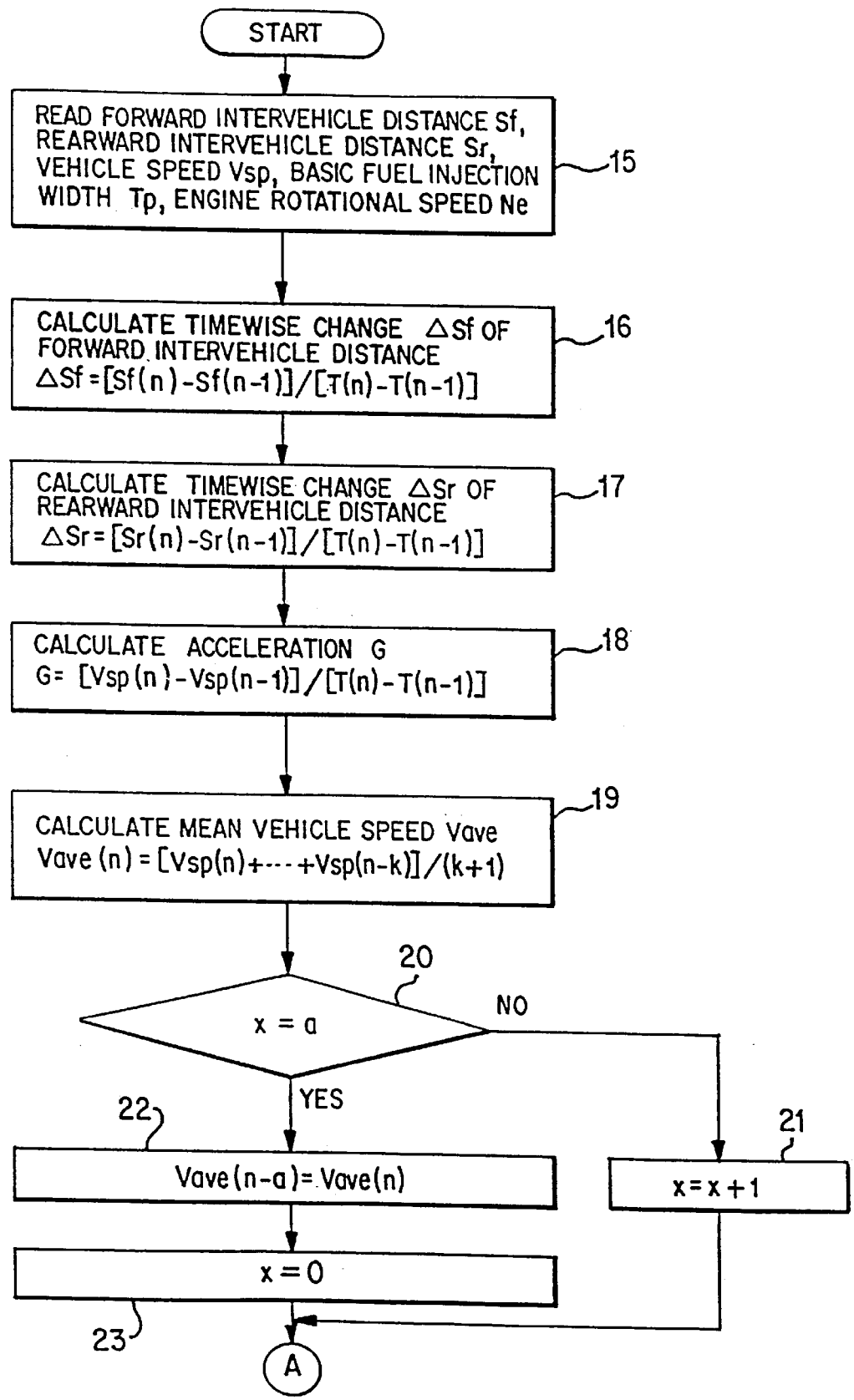
FIG. 6 is a control flow chart diagram illustrating the operation of the present invention for a motor vehicle running in a traffic jam.
Figure 7:
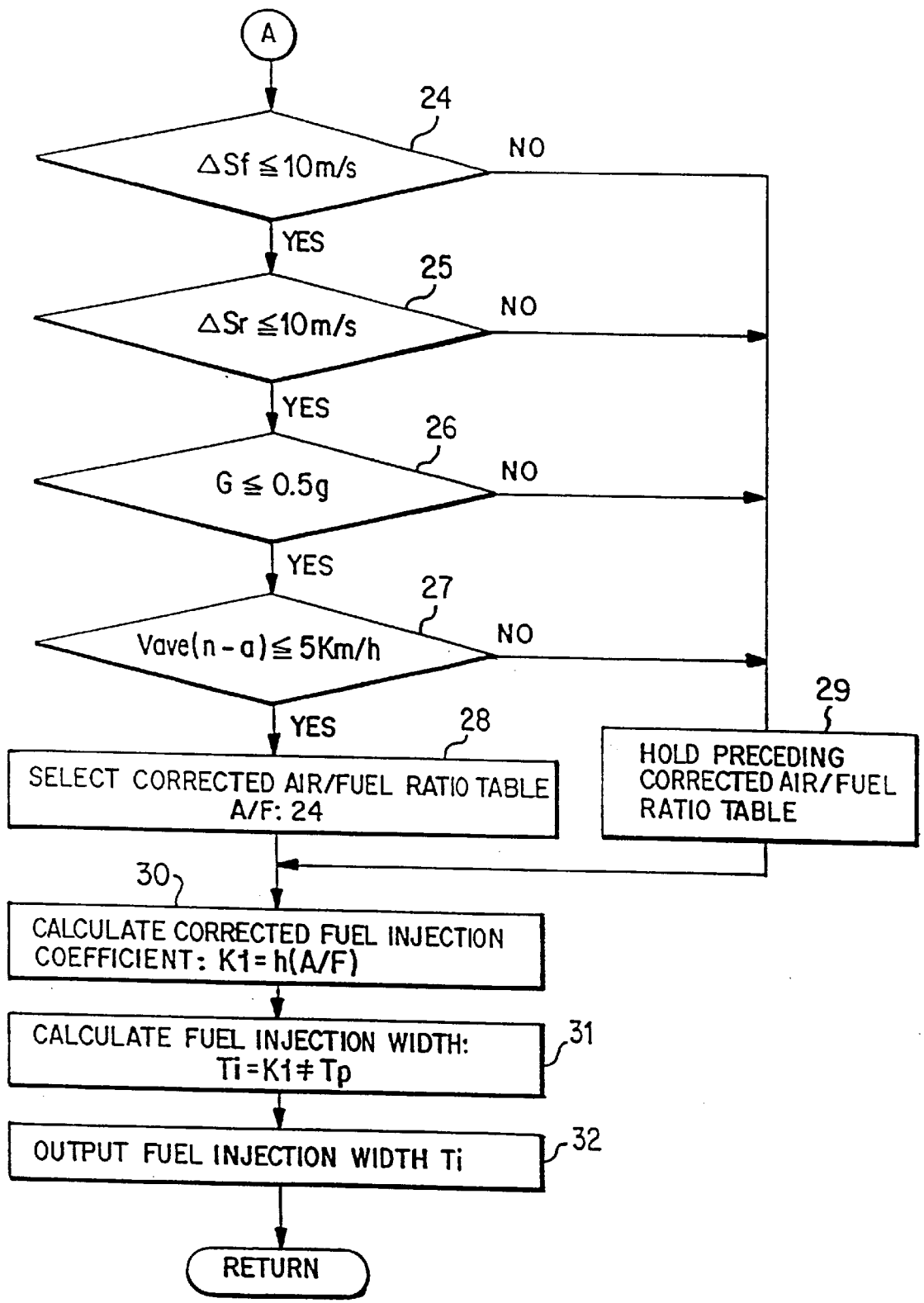
FIG. 7 is a control flow chart diagram continued from FIG. 6.

FIGS. 6 and 7 are control flow charts illustrating the operation of the control system for a motor vehicle operating in a traffic jam on a road. First, in step 15, the control system reads a forward intervehicle distance Sf, a rearward intervehicle distance Sr, a vehicle speed Vsp, a basic fuel injection width Tp and an engine rotational speed Ne. In step 16, the operation calculates a timewise change ΔSf of the forward vehicle distance by the following equation (Equation 1):

$$\Delta Sf = [Sf(n) - Sr(n-1)]/[T(n) - T(n-1)] \quad \text{(Equation 1)}$$

In step 17, the operation calculates a timewise change ΔSr of the rearward intervehicle distance by the following equation (Equation 2):

$$\Delta Sr = [Sr(n) - Sr(n-1)]/[T(n) - T(n-1)] \quad \text{(Equation 2)}$$

In step 18, the operation calculates the acceleration G of the driving vehicle by the following equation (Equation 3):

$$G = [Vsp(n) - Vsp(n-1)]/[T(n) - T(n-1)] \quad \text{(Equation 3)}$$

In step 19, the operation calculates the mean vehicle speed Vave of the driving vehicle by the following equation (Equation 4):

$$Vave(n) = [Vsp(n) + \ldots + Vsp(n-k)]/(k+1) \quad \text{(Equation 4)}$$

Further, in step 20, the operation performs a count for memorizing the mean vehicle speed Vave(n-a) of "a" times before. That is, the operation determines whether "x" equals "a". If "x" is not "a", the operation adds 1 to "x" in step 21 and proceeds to step 24 in FIG. 7. If "x" equals "a", the operation substitutes the mean vehicle speed Vave(n-a) of "a" times before, by Vave(n) in step 22, and nullifies "x" in step 23. Next, in step 24 in FIG. 7, the operation determines whether the timewise change ΔSf of the forward intervehicle distance which has been calculated in accordance with Equation 1 is not larger than, for instance, 10 m/s. That is, when the timewise change ΔSf is large, it is considered that the preceding vehicle has abruptly started and there is a nigh probability of there being no vehicle in front of the preceding vehicle. In step 25, the operation checks the timewise change of the rearward intervehicle distance as in step 24, and determines whether the driving vehicle is being squeezed by the forward and rearward vehicles due to the traffic jam. In step 26, the operation compares the acceleration of the driving vehicle. When the forward direction is stagnated, in starting the driving vehicle, the starting acceleration is limited, and the operation determines there is a high probability of a traffic jam in a case wherein the acceleration is not larger than, for instance, 0.5 q. Finally, in step 27, the operation employs the value which has been calculated in step 22, and determines whether the mean vehicle speed Vave(n-a) of "a" times before, is not larger than, for instance, 5 km/h. If the mean vehicle speed of the preceding several seconds is not larger than 5 km/h, the operation determines that the state wherein the vehicle speed is not greater than 5 km/h has continued for a while, that is, there is a high probability of a traffic jam. Accordingly, the operation performs an overall estimation of the judgments made from step 24 to step 27, and determines the traffic jam when all the judgments are satisfied, and then proceeds to step 28. Further, when any one of steps 24 through 27 is No, the operation proceeds to step 29 and employs the corrected air/fuel ratio table of the running environment which has been determined in the preceding operation. In step 28, since the traffic jam has been determined, the operation selects a lean mixture of 24 for the air/fuel ratio in the corrected air/fuel ratio table. Further, in step 30, the operation calculates a corrected fuel injection coefficient k1 by a function h(A/F) of the air/fuel ratio in step 28. In step 31, the control system calculates a fuel injection width Ti by the basic fuel injection width Tp and the corrected fuel injection coefficient k1 and outputs it in step 32.

Figure 8:
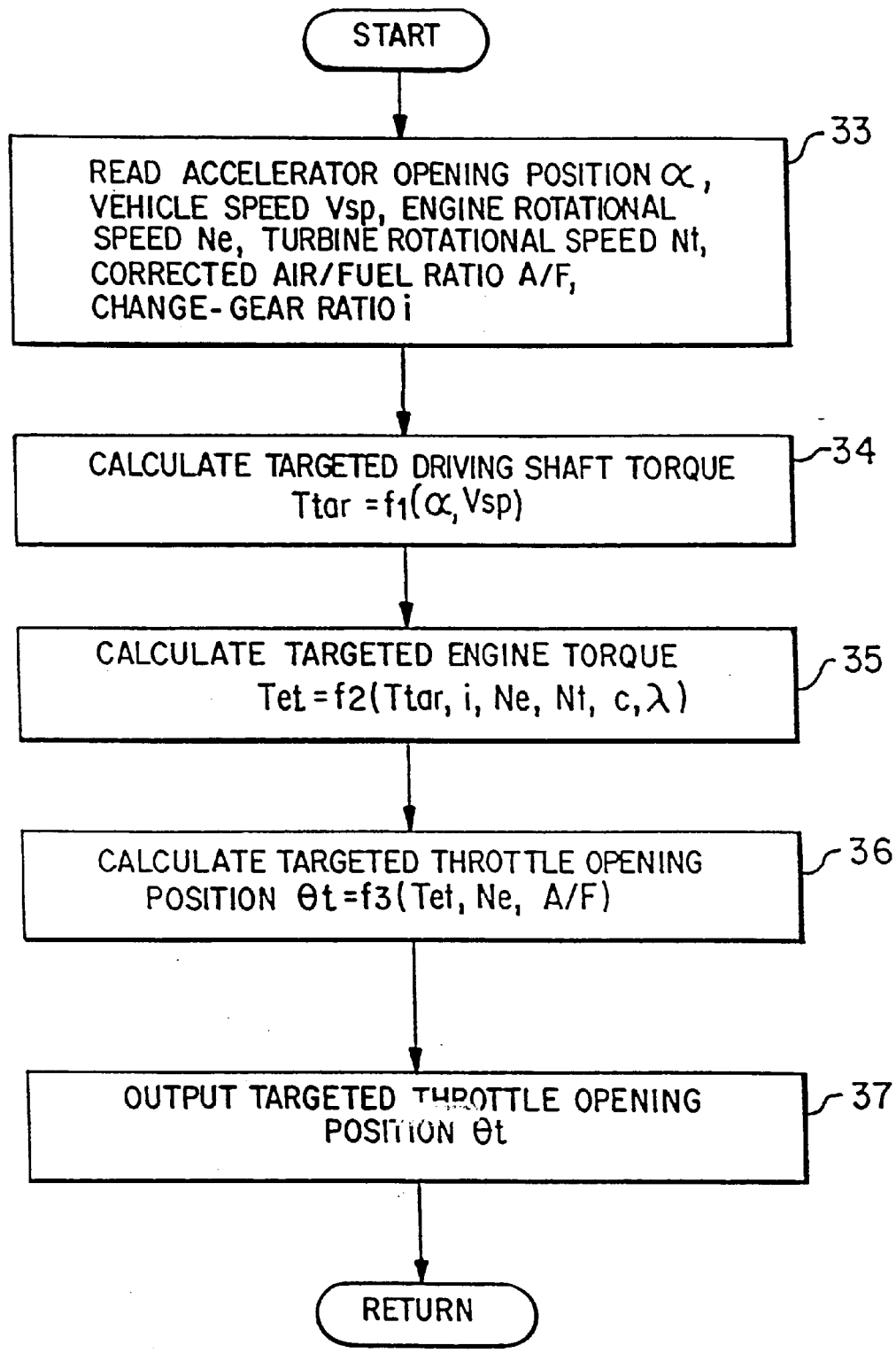
FIG. 8 is a control flow chart diagram illustrating the operation of controlling an air flow quantity.

FIG. 8 is a control flow chart illustrating the operation of controlling an air flow quantity. In a previously known technique, the engine rotational speed Ne and a turbine rotational speed Nt of the torque converter are detected, and a driving shaft torque Tt is calculated, from which the engine is then controlled. In this known method, the driving shaft torque Tt doesn't become the required torque, because a controlling amount for the engine is supplied using a value of the driving shaft torque Tt without using a real engine torque Te. Therefore, the engine is not controlled by the most suitable value. In accordance with the present invention, at first a required targeted driving shaft torque Ttar is decided, and a required targeted engine torque Tet is calculated. Then, the engine is controlled as the real engine torque Te becomes the targeted engine torque Tet. In this method, the engine is controlled by the most suitable value, because the real engine torque Te is controlled directly as it becomes the targeted engine torque Tet. As shown with respect to FIG. 8, first, in step 33, the control system reads the accelerator opening position α, the vehicle speed Vsp, the engine rotational speed Ne, the turbine rotational speed Nt, the corrected air/fuel ratio A/F, and a change-gear ratio i. Thereafter, in step 34, the targeted driving shaft torque calculator 11 (FIG. 3) calculates the targeted driving shaft torque Ttar using a function f1 (α, Vsp) of the accelerator opening position a and the vehicle speed Vsp. In step 35, the targeted engine torque calculator 12 calculates the targeted engine torque Tet using a function f2(Ttar, Ne, Nt, i, c, λ) of the targeted driving shaft torque Ttar, the engine rotational speed Ne, the turbine rotational speed Nt, the change-gear ratio i, a characteristic ratio c of the torque converter, and a torque ratio λ of the torque converter. In step 36, the throttle opening position calculator 13 calculates the targeted opening position et for the throttle using a function f3(Tet, Ne, A/F) of the targeted engine torque Tet, the engine rotational speed Ne, and the corrected air/fuel ratio A/F. Then, in step 37, the control system supplies control signals to the fuel injection valve 10.

Figure 9:
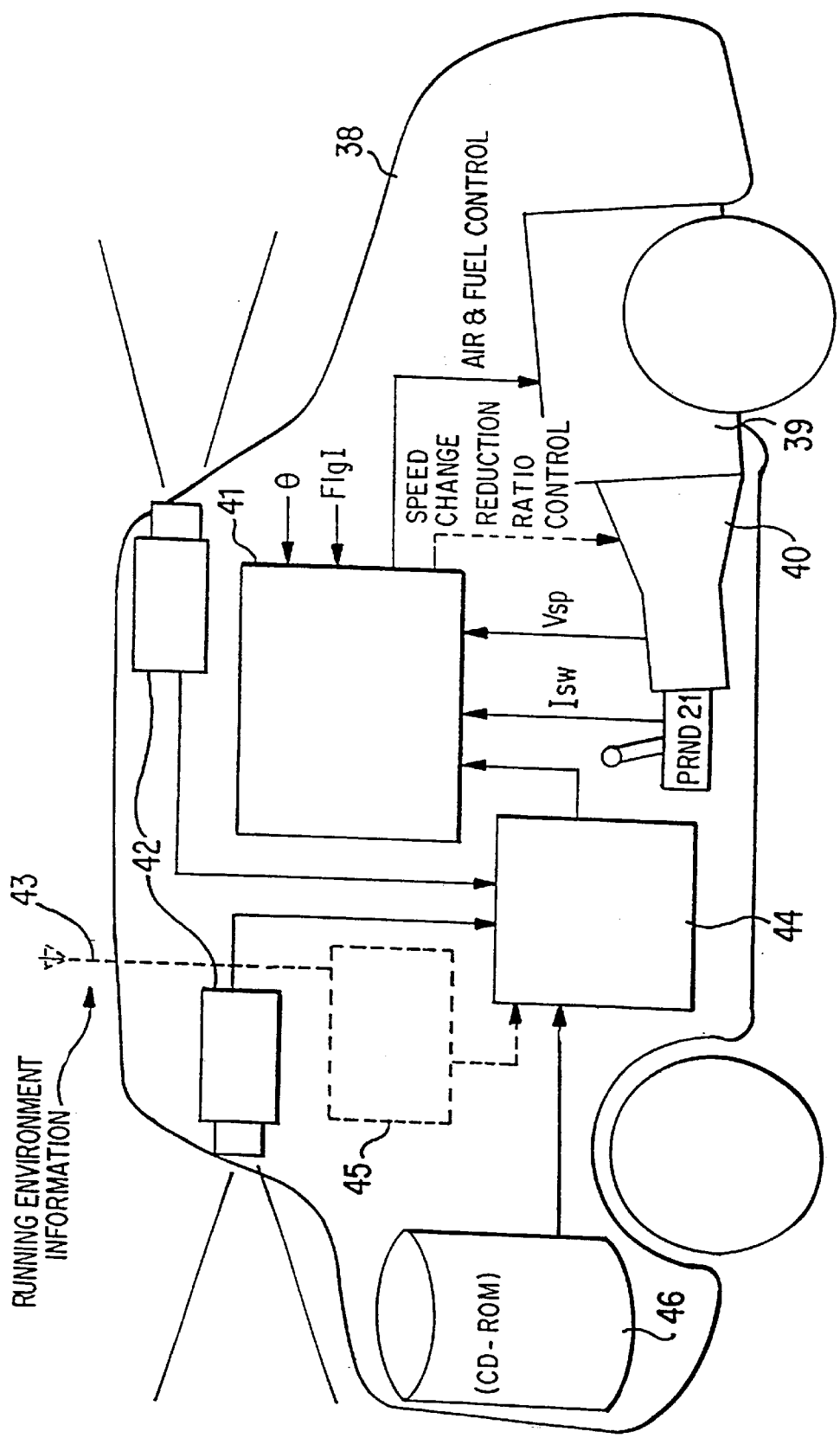
FIG. 9 is a conceptual block diagram illustrating a construction of the present invention in a motor vehicle.

FIG. 9 shows a system construction diagram of the present invention. An engine 39 and a transmission 40 are mounted on a car body 38. An air flow quantity, a fuel quantity, an ignition timing, a speed change reduction ratio and the like are controlled by signals from an engine power train controller 41. An intake port injection system of a conventionally known type, an inner cylinder injection system having a good control performance, or the like, is employed in the fuel control. Further, TV or video cameras 42 for detecting the outer environment and an antenna 43 for detecting the infrastructure information are mounted on the car body 38. Images of the TV cameras 42 are input into a running environment determining system 44 and are image-processed thereby recognizing forward and backward intervehicle distances, traffic signal information, traffic signs and a road state condition. Further, the antenna 43 is connected to an infrastructure information receiver 45. Traffic jam information, information regarding a traffic accident, current position information of the vehicle in relation to the surrounding infrastructure, are input from the infrastructure information receiver 45 to a running environment determining system 44. Further, map information, which has been stored in a CD-ROM 46 or the like, is input to the running environment determining system 44. The current running environment is determined by the infrastructure information and the map information. A signal corresponding to the running information is output from the running environment determining system 44 and is input to the engine power train controller 41. The air flow quantity, the fuel quantity, the speed change reduction ratio, and the like, corresponding to the running environment are controlled based on the signal. Further, the throttle opening position θ, a signal indicative of speed changing operation FlgI, the vehicle speed Vsp, the gear shift lever switch signal Isw and the like are input to the engine power train controller 41, which are employed for changing control quantities, determining the running environment and the like.

Figure 10:
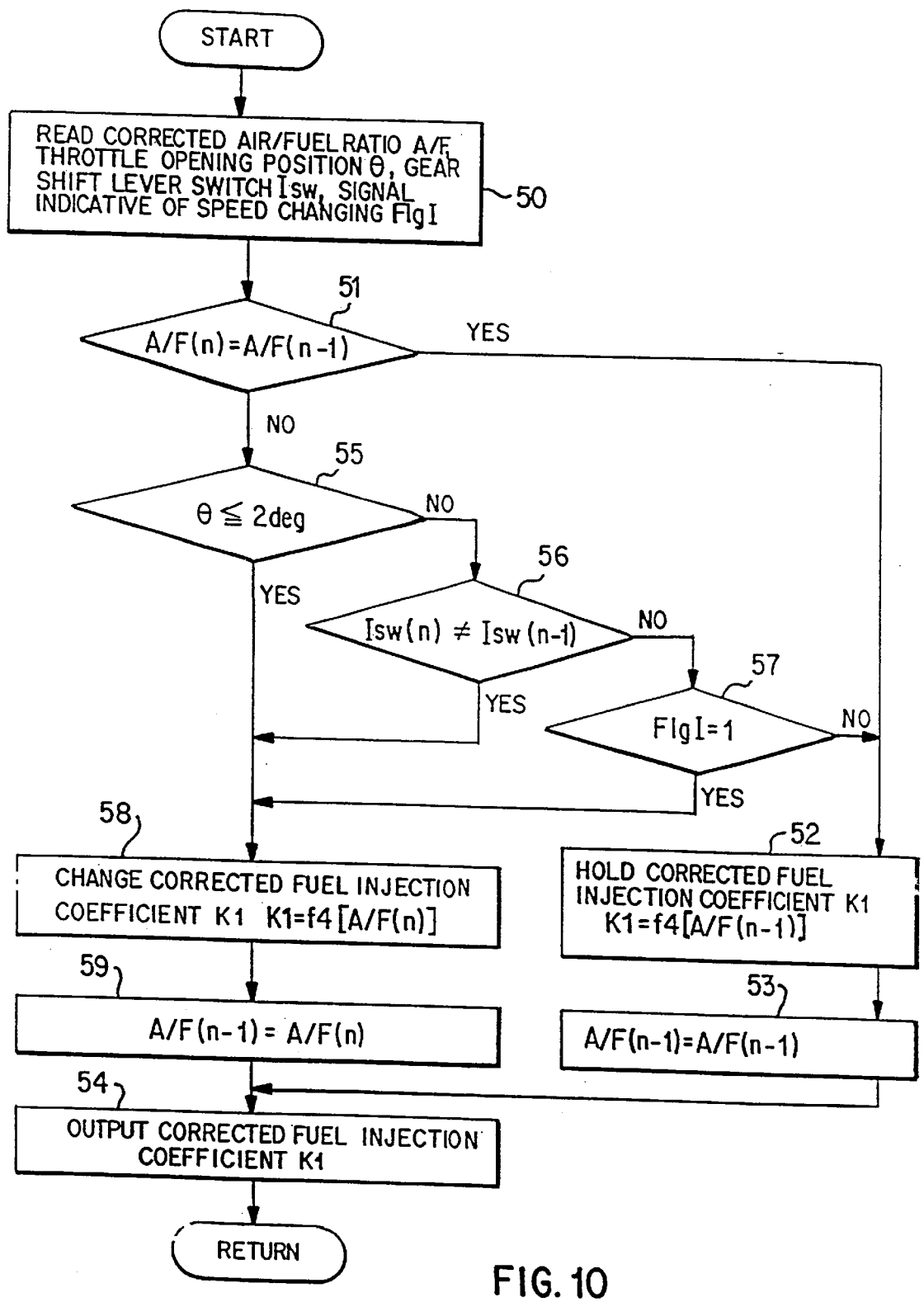
FIG. 10 is a control f low chart diagram illustrating the operation of an air/fuel ratio switching control.

FIG. 10 is a control flow chart of an air/fuel ratio switching control. In this invention, it is necessary to change the air/fuel ratio in accordance with the running environment. It is possible to prevent the torque variation due to the change in the air/fuel ratio by performing the change of the air/fuel ratio in synchronism with, for instance, stopping, speed changing, idling or the like. First, in step 50, the control system reads the corrected air/fuel ratio A/F, the throttle opening position θ, the gear shift lever switch signal Isw and the signal indicative of speed change operation FlgI. In step 51, the control system determines whether the current corrected air/fuel ratio of A/F(n) equals to the preceding corrected air/fuel ratio A/F(n−1). When the current corrected air/fuel ratio equals to the preceding corrected air/fuel ratio, the control system proceeds to step 52, calculates the corrected fuel injection coefficient k1 by f4[A/F(n−1)] and holds the preceding air/fuel ratio. Further, the control system carries out A/F(n−1) =A/F(n−1) and outputs the corrected fuel injection coefficient k1 which has been calculated in step 52, in step 54. Further, when the current corrected air/fuel ratio A/F(n) is different from the preceding corrected air/fuel ratio A/F(n−1) in step 51, the control system proceeds to step 55, checks the opening position θ of the throttle, and determines whether the engine is in an idling state condition or not. For instance, if the opening position is not larger than 2 degrees, the control system determines that the engine is idling. In step 56, the control system determines whether the gear shift lever switch Isw(n) has been changed. That is, when the operation checks the motion of the gear shift lever, it is effective to the change of the air/fuel ratio, because the state of engine is limited to stopping or gear changing. In step 57, the control system determines whether the signal indicative of gear changing FlgI, is 1 or not. When the signal is 1, it becomes possible to change the air/fuel ratio in synchronism with the torque variation in the speed changing, and the torque variation accompanied by the change of the fuel ratio can be prevented. When either one of step 55 through step 57 is YES, the control system proceeds to step 58, calculates the corrected fuel injection coefficient k1 by f4[A/F(n)] in synchronism with the change period, and changes the air/fuel ratio to a new target air/fuel ratio. Further, the control system carries out A/F(n−1) =A/F(n) in step 5g and outputs the corrected fuel injection coefficient k1 which has been calculated in step 58, in step 54.

Figure 11:
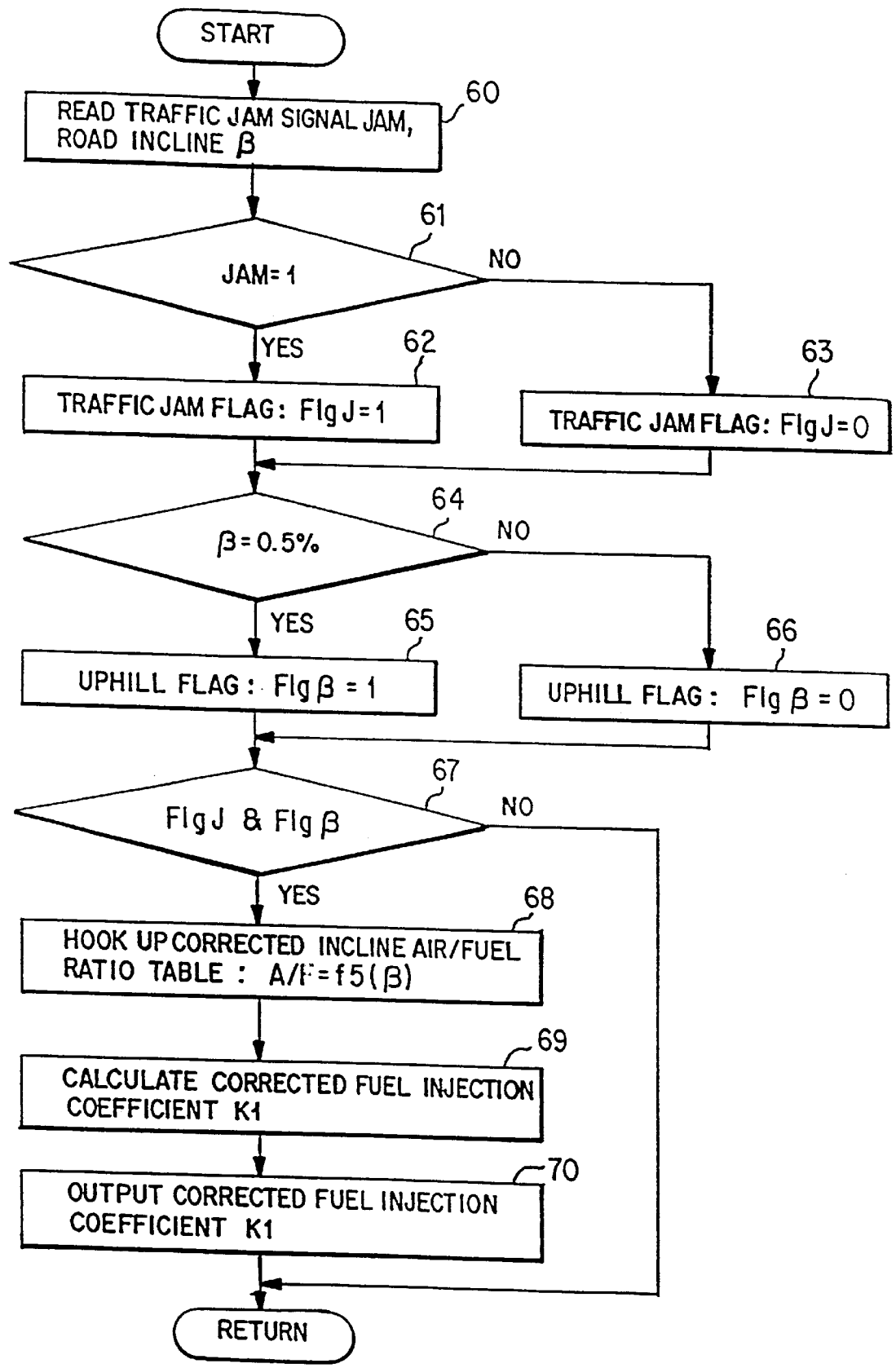
FIG. 11 is a control flow chart diagram illustrating the operation of the present invention for a motor vehicle running in the overlapping conditions of a traffic jam and/or an uphill or a downhill slope.

FIG. 11 is a control flow chart in case wherein a traffic jam and an uphill or a downhill condition are overlapped. For instance, when a traffic jam is caused on an hill road, an-engine output is required in correspondence to the uphill, and it is necessary to cope with it by a variable air/fuel ratio. First, in step 60, the control system reads a traffic jam signal JAM and a road incline β. In step 61, the control system determines whether a traffic jam is caused, that is, whether JAM is 1 or not. When JAM is 1, the control system proceeds to step 62 and carries out the determination of the traffic jam flag as FlgJ=1. When JAM is not 1, the control system proceeds to step 63 and carries out the determination of the traffic jam flag as FlgJ=0. Next, the control system determines whether the road incline β is not smaller than, for instance, 0.5%. When the road incline β is smaller than 0.5%, the control system determines that the road is a flat road or a downhill road and the air/fuel ratio had better be a lean mixture of about 24. By contrast, when the load incline β is not smaller than 0.5%, it is necessary to change the air/fuel ratio in accordance with the incline. Therefore, when the road incline β is not smaller than 0.5%, the control system proceeds to step 65 and caries out the determination of the uphill flag as Flg β=1. When the road incline β is smaller than 0.5%, the control system proceeds to step 66 and carries out the determination of the uphill flag as Flg β=0. Further, in step 67, the control system determines Flg J AND Flg β. When the determination is true, the control system proceeds to step 68, and when the determination is false, the 20 control system proceeds to RETURN. When the determination is true, the traffic jam and the uphill road are overlapped. Therefore, in step 68, the control system calculates the corrected air/fuel ratio A/F by a corrected incline air/fuel ratio table shown in FIG. 11 and a function f5(β) of the road incline β. Further, in step 69, the control system calculates the corrected fuel injection coefficient k1 by using the corrected air/fuel ratio A/F which has been calculated in step 68, and outputs it in step 70.

Figure 12:
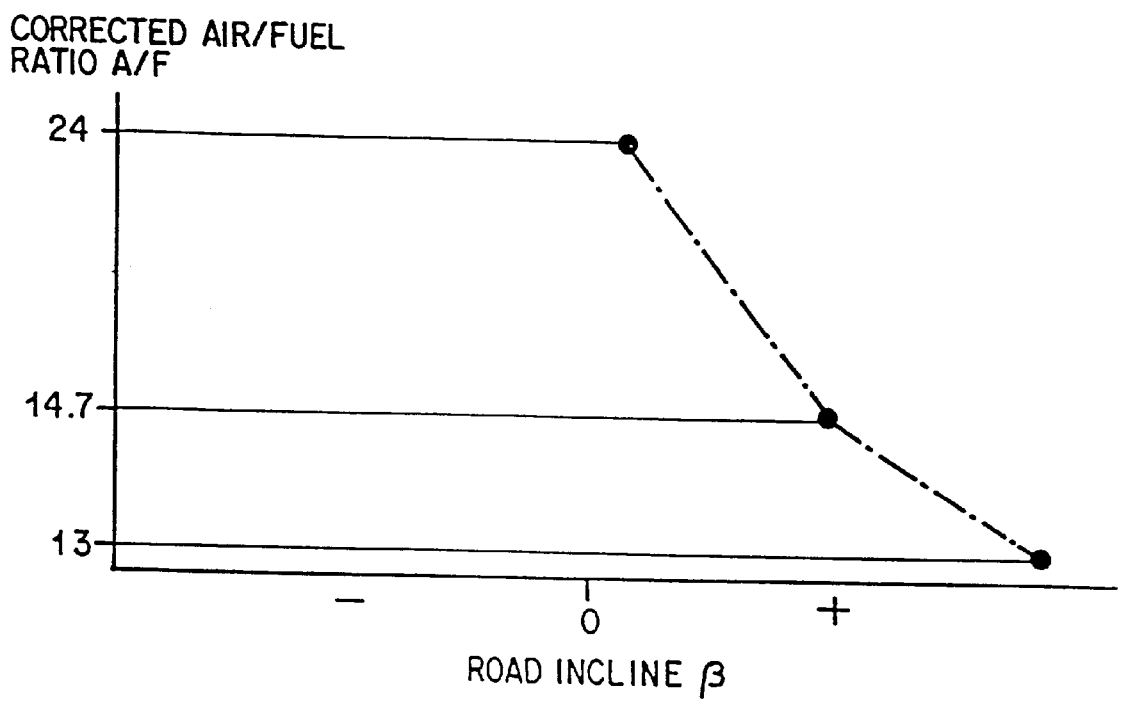
FIG. 12 is a correlation diagram illustrating a relationship between the road incline in a traffic jam and a corrected air/fuel ratio.

FIG. 12 shows a corrected air/fuel ratio with respect to the road incline in case of a traffic jam. In a traffic jam on a road which is in a range from a flat road to a minus incline, the engine output is not considerably needed, and the air/fuel ratio of about 24 is sufficient. By contrast, under the uphill incline condition, the engine output which is required according to the angle of incline, increases. Accordingly, it is necessary to reduce the air/fuel ratio and to form a rich mixture. The actual fuel cost performance can be promoted by the above control.

According to the present invention, the air/fuel ratio changes at any time in accordance with the change in the running environment. Therefore, it becomes possible to effectively utilize the engine output and further the actual fuel cost performance is promoted. The switching of the air/fuel ratios is always performed in accordance with a running environment other than a steady state condition such as speed changing, stopping, idling, shift lever operation or the like. Therefore, the unpleasant feeling by the torque variation accompanied by the change in the air/fuel ratio. Accordingly, the reduction of fuel cost and the promotion of drivability can be achieved.

What is claimed is:

1. A vehicle, comprising:

an engine;

a throttle valve controlling an amount of air sucked into said engine;

an accelerator pedal controlling an opening of said throttle valve;

a controller for delivering a control signal which controls said opening of said throttle valve based on a stroke of said accelerator pedal; and at least one outer environment detector for detecting an outer environment information of said vehicle;

wherein said signal delivered from said controller is corrected by a value which indicates said outer environment information detected by said outer environment detector.

2. A vehicle according to claim 1, wherein said outer environment information is a distance from a forward vehicle.

3. A vehicle according to claim 1, further comprising:

memory for storing data which indicates a control amount of said throttle valve in relation to said stroke of said accelerator pedal.

* * * * *